US008132367B2

(12) United States Patent
Cottier

(10) Patent No.: US 8,132,367 B2
(45) Date of Patent: Mar. 13, 2012

(54) CONTAINER FOR GROWING PLANTS

(75) Inventor: Richard A. Cottier, Toledo, OH (US)

(73) Assignee: Waldo & Associates, Inc., Perrysburg, OH (US)

(*) Notice: Subject to any disclaimer, the term of this patent is extended or adjusted under 35 U.S.C. 154(b) by 17 days.

(21) Appl. No.: 12/692,864

(22) Filed: Jan. 25, 2010

(65) Prior Publication Data

US 2010/0192459 A1 Aug. 5, 2010

Related U.S. Application Data

(60) Provisional application No. 61/149,476, filed on Feb. 3, 2009.

(51) Int. Cl.
*A01G 9/02* (2006.01)

(52) U.S. Cl. .......................................................... 47/83

(58) Field of Classification Search .............. 47/83, 65.5, 47/65.7, 66.1, 70, 72–74, 78, 84, 67, 77
See application file for complete search history.

(56) References Cited

U.S. PATENT DOCUMENTS

| 532,687 | A | | 1/1895 | Mulhaupt | |
|---|---|---|---|---|---|
| 986,395 | A | | 3/1911 | King | |
| 2,170,714 | A | | 8/1939 | Ferguson | |
| 2,630,934 | A | * | 3/1953 | Elmendorf | 217/1 |
| 3,047,185 | A | | 7/1962 | Lewis | |
| 3,529,742 | A | | 9/1970 | Cumming | |
| 3,696,960 | A | | 10/1972 | Smirle | |
| 3,726,042 | A | | 4/1973 | Haile | |
| 3,818,633 | A | * | 6/1974 | Sable | 47/67 |
| 4,057,931 | A | | 11/1977 | Stutelberg et al. | |
| 4,151,680 | A | | 5/1979 | Sena | |
| 4,181,234 | A | * | 1/1980 | Feighan | 217/122 |
| 4,287,997 | A | | 9/1981 | Rolfe et al. | |
| 4,646,469 | A | * | 3/1987 | Scism | 47/67 |
| 4,741,124 | A | * | 5/1988 | Scism | 47/67 |
| 4,961,284 | A | * | 10/1990 | Williams | 47/66.5 |
| 5,050,755 | A | | 9/1991 | Strawder | |
| 5,301,465 | A | * | 4/1994 | Caferro | 47/65.8 |
| 5,768,825 | A | * | 6/1998 | Reiger | 47/78 |
| 5,870,856 | A | * | 2/1999 | Friend | 47/65.7 |
| 6,612,072 | B2 | * | 9/2003 | Busby et al. | 47/65.8 |
| 7,140,149 | B2 | | 11/2006 | Searle et al. | |
| 7,669,366 | B2 | * | 3/2010 | Felknor | 47/65.8 |

OTHER PUBLICATIONS

Howard Enterprises; *Basket Buddies;* Miami, Oklahoma 74354-9337.
Bloom Master Planter Corporation: Hanging Baskets and Box Planters; http://www.bloommaster.com/.
SIMPLYPLANTERS.com; 1-866-579-5183; http://www.simplyplanters.com/.
Topsy Turvy Tomato Planter; http://www.pronto.com/.
Bosmere Products, Inc.; 30 Years and Still Growing.
Gardman USA, Inc.; 4175 Royal Drive, Suite 700, Kennesaw, GA 30144; Grow It.
Gardener's Supply Company; Vegetable planters; http://www.gardeners.com.

* cited by examiner

*Primary Examiner* — Kristen Hayes
(74) *Attorney, Agent, or Firm* — Fraser Clemens; Martin & Miller LLC; J. Douglas Miller

(57) ABSTRACT

A container for receiving and growing plants is disclosed. The container includes a latticework having a bottom wall and a sidewall extending from the bottom wall defining a cavity with an open end, a covering for the bottom wall and the sidewall for receiving plant growth medium for supporting roots of plants, and a plurality of spaced apart flexible cords securing the covering to the latticework.

18 Claims, 3 Drawing Sheets

CONTAINER FOR GROWING PLANTS

CROSS-REFERENCE TO RELATED APPLICATION

This application claims the benefit of U.S. provisional patent application Ser. No. 61/149,476 filed Feb. 3, 2009, hereby incorporated herein by reference in its entirety.

FIELD OF THE INVENTION

The invention relates to planters, and more specifically to a planter including apertures to maximize the growing of plants in the planter.

BACKGROUND OF THE INVENTION

Container gardening is a form of gardening wherein plants are grown in a container, commonly referred to as a planter. Container gardening can be practiced indoors or outdoors. The versatility of container gardening enables plants to be grown during non-growing seasons and allows a person that does not have an outdoor area for a garden to maintain a garden.

Many types of containers are currently available for container gardening such as terra cotta pots, plastic pots, and wood, plastic, or concrete planter boxes. Some containers include features to maximize the number of plants that can be grown therein. One such container is illustrated in U.S. Pat. No. 7,140,149 to Searle et al. which includes apertures formed in the planter to receive a plant and allow a plant to grow outwardly from the sidewall.

Many of the prior art containers for use in container gardening are formed from plastic; or a material such as clay that can be easily broken. Additionally, many gardeners desire a container having an aesthetic appearance; and would prefer a container formed from natural or recycled materials to compliment the environmentally friendly practice of gardening.

It would be desirable to have a container for growing plants formed from an aesthetic organic material and maximizing the number of plants that can be grown therein.

SUMMARY OF THE INVENTION

Compatible and attuned with the present invention, a container for growing plants formed from an aesthetic organic material and maximizing the number of plants that can be grown therein, has surprisingly been discovered.

The above objective, as well as others, may be achieved by a container for growing plants comprising a latticework including a bottom wall and a sidewall extending from the bottom wall defining a cavity having an open end; a covering for the bottom wall and the sidewall for receiving plant growth medium for supporting roots of plants; and a plurality of spaced apart flexible cords securing the covering to the latticework.

BRIEF DESCRIPTION OF THE DRAWINGS

The above, as well as other objects and advantages of the invention, will become readily apparent to those skilled in the art from the following detailed description of an embodiment of the invention when considered in the light of the accompanying drawings, in which.

DETAILED DESCRIPTION OF AN EMBODIMENT OF THE INVENTION

Figure 1:
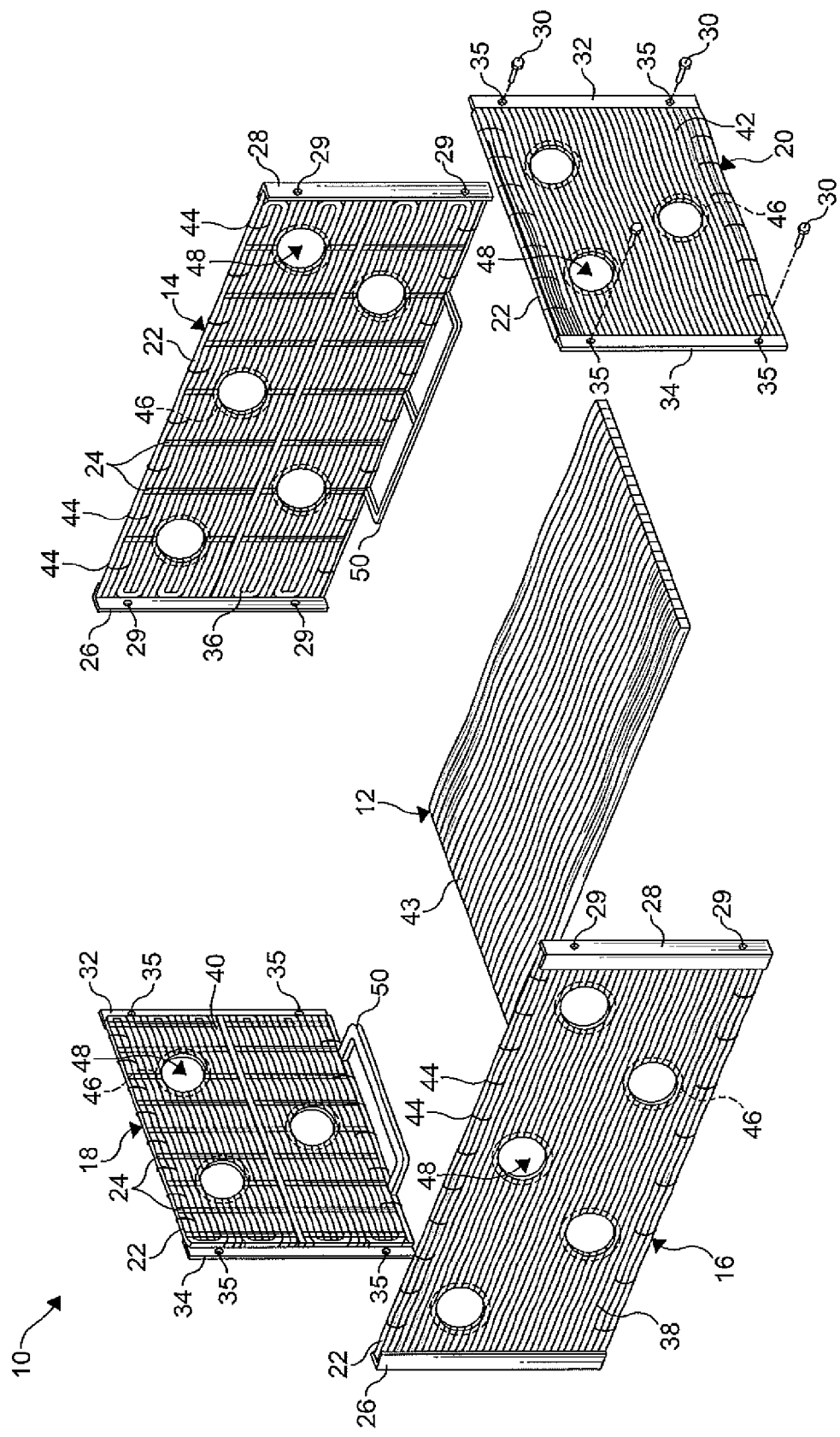
FIG. 1 is a perspective exploded view of a container according to an embodiment of the invention.
Figure 2:
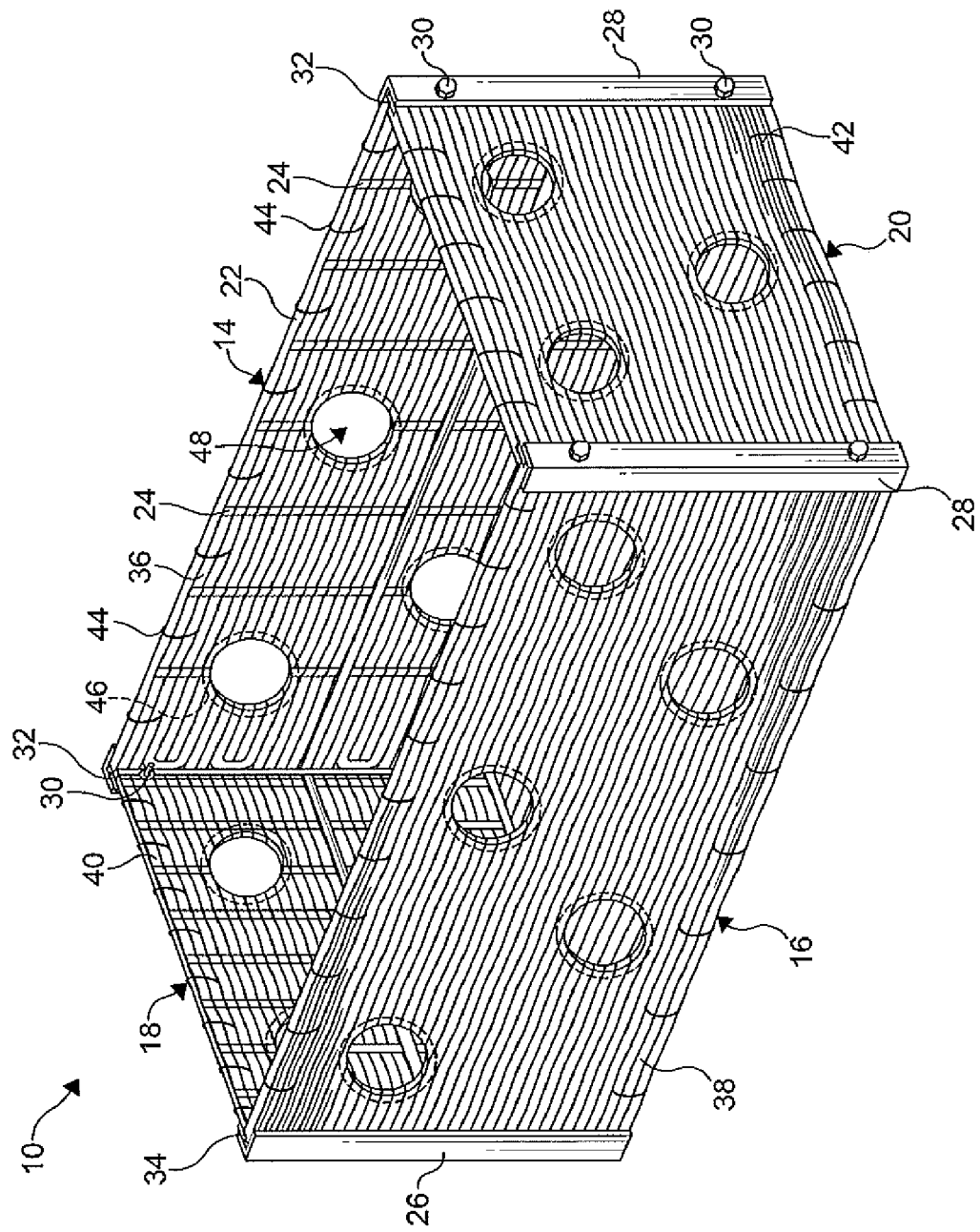
FIG. 2 is a perspective view of an assembled container incorporating the elements illustrated in FIG. 1.
Figure 3:
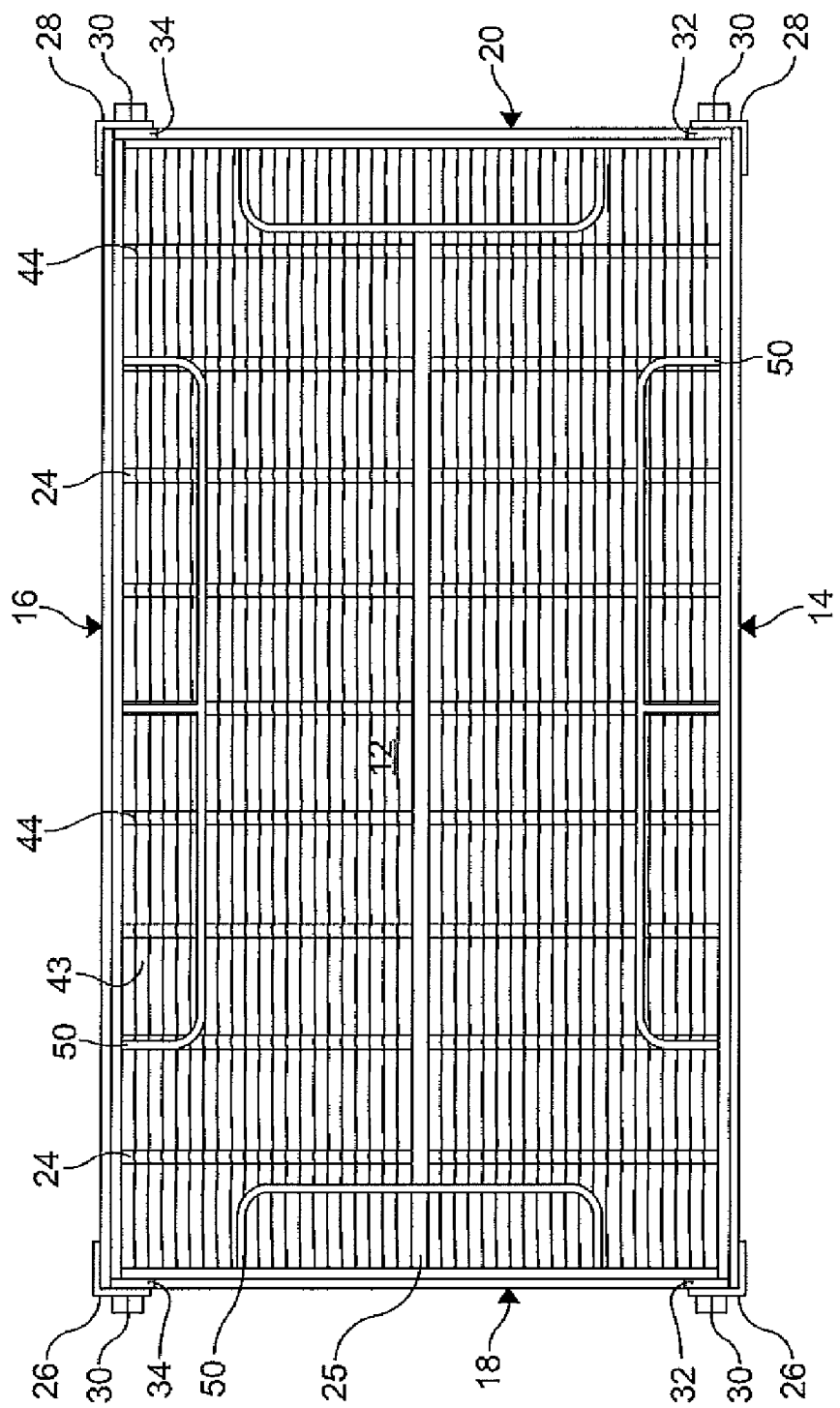
FIG. 3 is a bottom plan view of the container illustrated in FIG. 2.

The following detailed description and appended drawings describe and illustrate an exemplary embodiment of the invention. The description and drawings serve to enable one skilled in the art to make and use the invention, and are not intended to limit the scope of the invention in any manner.

Referring to the drawings, there is illustrated a container or a planter for growing plants, generally indicated by reference numeral 10. The container 10 includes a bottom wall 12 and sidewalls 14, 16, 18, 20. The sidewalls 14, 16, 18, 20 extend from the peripheral edge of the bottom wall 12 and terminate at a rim 22. The bottom wall 12 and the sidewalls 14, 16, 18, 20 define a hollow interior of the container 10.

The bottom wall 12 and the sidewalls 14, 16, 18, 20 each include a supporting latticework 24. As a non-limiting example, the lattice work 24 includes a plurality of lateral and vertical supports to provide a substantially rigid frame having a generally rectangular shape. In the embodiment shown, the bottom wall 12 includes a lateral support 25, wherein the lattice work 24 rests thereon to constitute the bottom of the container 10. It is understood that any shape and configuration of supports may be used. It is further understood that materials such as metal, wood, bamboo, or plastic may be employed for the latticework 24.

The particular configuration of the container 10 is a function of the dimensions of the bottom wall 12 and the sidewalls 14, 16, 18, 20. In the illustrated embodiment, the sidewalls 14, 16 are longer than the sidewalls 18, 20 resulting in a generally rectangular container. It will be readily apparent that a generally square container may be made by forming the sidewalls 14, 16, 18, 20 with substantially the same horizontal and vertical dimensions.

Aside from the particular dimensions, the sidewalls 14, 16, 18, 20 are comprised of substantially the same structural elements resulting in obvious economics. Each of the sidewalls 14, 16, 18, 20 includes the latticework 24 forming the basic structural support elements. The larger sidewalls 14, 16 include elongate end connecting vertically extending elements 26, 28 with spaced apart apertures 29 for receiving fasteners 30 as will be explained. The smaller sidewalls 18, 20 include elongate end connecting vertically extending elements 32, 34 having spaced apart apertures 35 adapted to be substantially aligned with the apertures 29 in the respective elements 26, 28 when assembled. Satisfactory results have been achieved by forming the elements 26, 28, 32, 34 of angle irons, for example, having generally L-shaped cross-sections.

When the sidewalls 14, 16, 18, 20 are assembled, as illustrated, the spaced apart apertures 29, 35 in the vertical elements 26, 28, 32, 34 are caused to be aligned to receive appropriate fasteners 30, such as threaded fasteners, for example. Nuts and bolts may be used as well as rivets, and other more permanent fasteners.

It will be appreciated that prior to being assembled, the latticework 24 of the sidewalls 14, 16, 18, 20 are provided with respective outer coverings 36, 38, 40, 42. In certain embodiments, a bottom covering 43 similar in appearance and structure as the coverings 36, 38, 40, 42 is disposed of juxtaposed position on the latticework 24 of the bottom wall 12. Each of the coverings 36, 38, 40, 42, 43 is typically formed of rope-like strands of organic material such as banana leaf rattan, for example. The strands are folded upon one another to form an extended surface covering for each of the respective latticework 24 which are the primary structural elements of the respective sidewalls 14, 16, 18, 20 and bottom wall 12. The coverings 36, 38, 40, 42, 43 are typically secured to the respective latticework 24 by cords 44 suitably positioned.

Each of the latticeworks 24 of the sidewalls 14, 16, 18, 20 includes a plurality of rings 46 which cooperate with aligned apertures 48 formed in the associated coverings 36, 38, 40, 42 of the sidewalls 14, 16, 18, 20. The rings 46 and the associated apertures 48 in the coverings 36, 38, 40, 42 provided access to the interior of the container 10 and functions to permit plants to grow therethorough as will be more readily understood hereinafter in the description.

In the embodiment shown, each of the sidewalls 14, 16, 18, 20 include a bottom support member 50 attached to the lattice 24. The bottom support members 50 extend outwardly from the sidewalls 14, 16, 18, 20 toward the interior of the container 10. The bottom 12 rests on the bottom support members 50.

It should be understood that the container 10 can be provided with accessories such as wheels and handles to facilitate moving the container 10. Additionally, accessories such as a plant trellis, plant grow lights, and a soil heating element can be provided to facilitate the growing of plants in the container 10.

In the illustrated embodiment, the container 10 has a generally rectangular shape. It should be understood that the container 10 can be formed in other shapes such as a cube or a cylinder, for example.

Typically, a liner (not shown) may be provided for the interior of the container 10. Favorable results have been obtained forming the liner from a polyethylene sheeting. It should be understood that other materials can be employed to form the liner as desired. The polyethylene sheeting covers the apertures 48 in the sidewalls 14, 16 and the end walls 18, 20. The liner is punctured to receive a plant through the aperture 48 and the liner.

In use, the bottom wall 12 and the sidewalls 14, 16, 18, 20 are assembled to form the container 10. The sidewalls 14, 16, 18, 20 are joined together by aligning the apertures 29, 35 of the elongate end connecting elements 26, 28, 32, 34 and inserting the threaded fasteners 30 therethrough. The bottom wall 12 is disposed between the sidewalls 14, 16, 18, 20 and rests on the bottom support members 50 extending from each of the sidewalls 14, 16, 18, 20. When unassembled, the bottom wall 12 and the sidewalls 14, 16, 18, 20 can be stacked upon each other to minimize a cost associated with shipping and storing the container 10.

The liner is placed in the interior of the assembled container 10. A selected amount of soil is disposed in the liner within the container 10. Typically, the amount of soil disposed within the container 10 substantially covers the uppermost apertures 48 formed in the sidewalls 14, 16, 18, 20. However, it should be understood that lesser amounts of soil can be provided as desired. Selected plants are planted in the soil and can extend or grow outwardly therefrom through the opening to the container 10 and the apertures 48 formed in the sidewalls 14, 16, 18, 20. When planting a plant to extend outwardly from the apertures 48, the liner is punctured to form a hole therein adjacent the aperture 48. The root system of the plant is received through the aperture 48 and the hole formed in the liner, and disposed within the soil, wherein the stems and associated foliage of the plant extend outwardly from the soil through the hole in the liner and the aperture 44 to the exterior of the container 10.

The container 10 provides a user with a planter having a natural appearance that compliments the appearance of the plants growing therein. The container 10 is provided in components; namely the bottom wall 12 and the sidewalls 14, 16, 18, 20, that can be stacked together to minimize the costs associated with shipping and storing the container 10. A user can easily assemble the components to form the container 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A container for growing plants comprising:
   a latticework including a bottom wall and a sidewall extending from the bottom wall defining a cavity having an open end;
   a covering for the bottom wall and the sidewall for receiving plant growth medium for supporting roots of plants; and
   a plurality of spaced apart flexible cords securing the covering to the latticework;
   wherein the sidewall of the latticework includes an aperture and the covering includes an aperture; and
   wherein the aperture of the sidewall and the aperture of the covering are aligned permitting a plant to extend therethrough.

2. A container as defined in claim 1 wherein the latticework is formed of interlocked lattice members.

3. A container as defined in claim 2 wherein the aperture of the sidewall of the latticework is defined by a ring.

4. A container as defined in claim 1 wherein the covering includes a plurality of lengths of juxtaposed elongate strands of flexible material.

5. A container as defined in claim 4 wherein the strands of flexible material are fibrous.

6. A container as defined in claim 4 wherein the strands of flexible material are folded upon themselves.

7. A container as defined in claim 1 wherein the latticework is formed of a rigid material.

8. A container as defined in claim 7 wherein the rigid material includes metal.

9. A container as defined in claim 7 wherein the rigid material is formed from a group consisting of metal, plastic, or fibrous plant growth.

10. A container for growing plants comprising:
    a latticework including a bottom wall and a sidewall extending from the bottom wall defining a cavity having an open end;
    a covering for the bottom wall and the sidewall for receiving plant growth medium for supporting roots of plants; and
    a plurality of spaced apart flexible cords securing the covering to the latticework;
    wherein the sidewall of the latticework includes an aperture and the covering includes an aperture; and
    wherein the aperture of the sidewall and the aperture of the covering are aligned permitting a plant to extend therethrough;
    wherein the latticework is formed of interlocked lattice members; and
    wherein the aperture of the sidewall is defined by a ring.

11. A container as defined in claim 10 wherein the covering includes a plurality of lengths of juxtaposed elongate strands of flexible material.

12. A container as defined in claim 11 wherein the strands of flexible material are fibrous.

13. A container as defined in claim 11 wherein the strands of flexible material are folded upon themselves.

14. A container as defined in claim 10 wherein the latticework is formed of a rigid material.

15. A container as defined in claim 14 wherein the rigid material includes metal.

16. A container as defined in claim 14 wherein the rigid material is formed from a group consisting of metal, plastic, or fibrous plant growth.

17. A container for growing plants comprising:
- a latticework including a bottom wall and a sidewall extending from the bottom wall defining a cavity having an open end;
- a covering for the bottom wall and the sidewall for receiving plant growth medium for supporting roots of plants; and
- a plurality of spaced apart flexible cords securing the covering to the latticework, wherein the covering includes a plurality of lengths of juxtaposed elongate strands of flexible material, and wherein the strands of flexible material are folded upon themselves.

18. A container as defined in claim 17 wherein the strands of flexible material are fibrous.

* * * * *